United States Patent [19]
Kuhn

[11] 3,870,741
[45] Mar. 11, 1975

[54] METHOD OF MAKING A FOAM PACKAGE

[75] Inventor: George B. Kuhn, North Canton, Ohio

[73] Assignee: The Goodyear Tire & Rubber Company, Akron, Ohio

[22] Filed: May 4, 1972

[21] Appl. No.: 250,460

Related U.S. Application Data
[63] Continuation of Ser. No. 29,870, April 20, 1970, abandoned.

[52] U.S. Cl............ 264/46.4, 206/46 FC, 206/65 K
[51] Int. Cl... B29d 27/00, B65d 75/00, B65d 85/30
[58] Field of Search.......... 206/46 FC, 65 K; 264/45

[56] References Cited
UNITED STATES PATENTS

| | | | |
|---|---|---|---|
| 2,895,603 | 7/1959 | Freeman | 206/46 |
| 3,037,652 | 6/1962 | Wallace | 264/45 X |
| 3,201,911 | 8/1965 | Woodland | 264/45 X |
| 3,464,540 | 9/1969 | Stark | 206/46 |
| 3,485,347 | 12/1969 | McGill et al. | 206/46 |
| 3,503,177 | 3/1970 | Kropscott et al. | 264/45 X |
| 3,536,190 | 10/1970 | Hirsch et al. | 264/45 X |
| 3,618,287 | 11/1971 | Gobhai et al. | 264/45 X |

*Primary Examiner*—H. S. Cockeham
*Attorney, Agent, or Firm*—F. W. Brunner; Gordon C. Mack; J. M. Wallace, Jr.

[57] ABSTRACT

An article or plurality of articles are supported in a mold, usually covered with film or a liquid release. Plastic is foamed up, over and around this in the mold. The resulting package is removed from the mold. It is not damaged by the air or water or most solvents and the contents of the package are protected from the deteriorating effect of air and moisture. A tear strip may be incorporated in the foam—preferably at about the middle—to facilitate subsequent removal of foam from the article. A boss and depression of about the same area and shape may be formed on opposite sides of the package (usually the top and bottom) to facilitate stacking for storage. A trademark may be molded in the foam surface.

1 Claim, 7 Drawing Figures

PATENTED MAR 11 1975
3,870,741
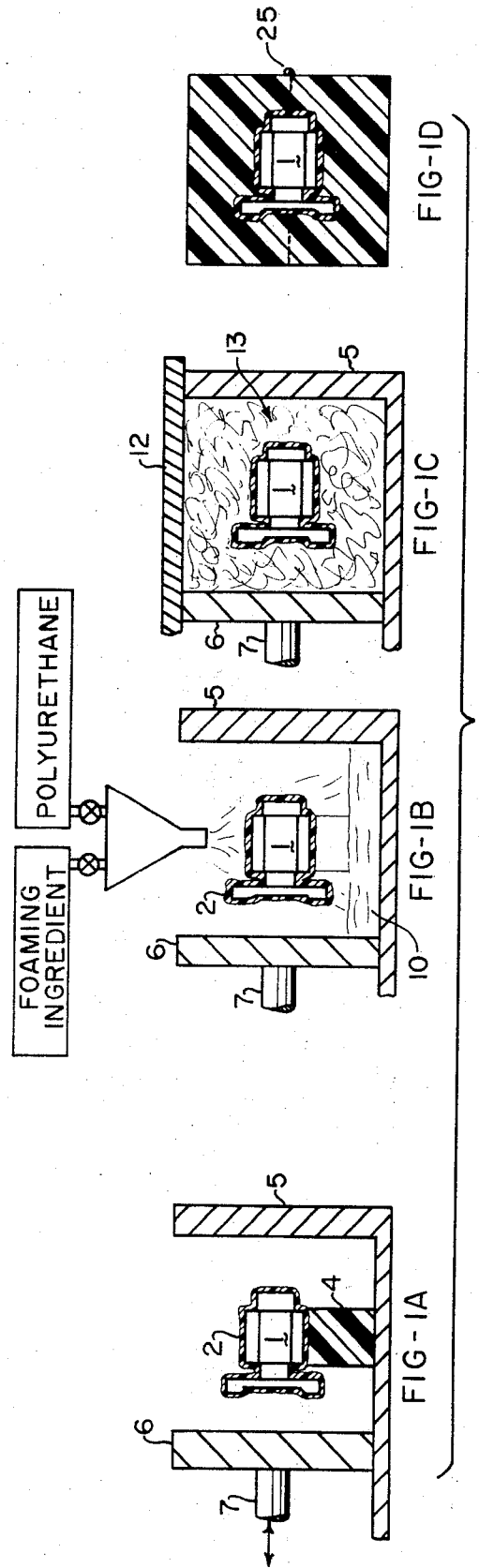
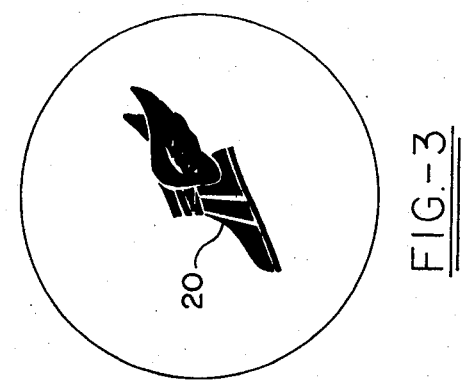
FIG.-3
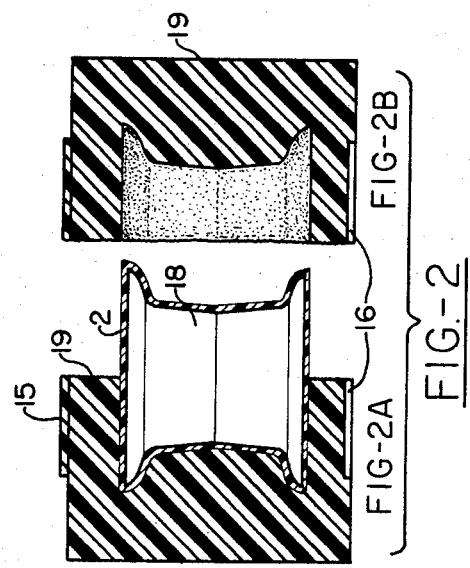
INVENTOR
GEORGE B. KUHN
BY
Gordon C. Lusk
ATTORNEY

METHOD OF MAKING A FOAM PACKAGE

The invention relates to a foamed plastic package, and its preparation.

It has been proposed to cover an article (or a plurality of articles) with a protective film and cover these in foam inside of a cardboard container, and then strap the container closed. The container is not necessary, it is expensive, it adds to freight costs, and it deteriorates when wet with a liquid or the moisture in the air.

According to this invention, a package is similarly formed by foaming plastic up, over and around a film-protected article or articles. No container is used. The foam itself forms the surface of the package. It is not affected by the air or moisture in the air or by water, fuel, grease, solvents, etc. that may be spilled on it or on the floor on which it is placed. Also, the foam package is strong and will resist impact.

The mold in which the package is formed may be any shape, and it may be reused any number of times. It may be supported on a conveyor for mass production, and may be a part of the conveyor. The inner surfaces of the mold may be shaped to form bosses or depressions of desired shape on or in the surface of the package.

The articles packaged may be delicate instruments which are protected from damage by the foam. They may be machines, engines, parts (such as carburetors, wheels, etc.), etc. If the article comprises rubber or other oxidizable material, such as the gaskets in a carburetor, the foam will exclude the air and prolong the life of the rubber, etc. indefinitely.

This package has particular value in a shipping room which handles many different items which if packaged in any usual way would necessitate the storage of packaging materials of many sizes. For the package of this invention, no storage space is necessary. The foam is formed from a liquid which is stored in one or more tanks, which need not occupy any floor space. The same liquid is used for packages of all sizes and shapes. Molds of different sizes may be required, but in a plant producing a single item, all molds may be of the same size. The molds are of any suitable construction.

The packaging operation may be completely automated from the placement of the package in the mold to the placement of the foam package on a pallet or the like.

Certain articles can be covered directly with non-adherent foams. Usually a suitable film covers the article or articles to be packaged. This may be a bag, or a single sheet or a plurality of sheets may be used, e.g., one sheet may be used under the article and another above it. Vinyl film or polyethylene film may be used, but the invention is not limited to the use of these films. Certain films may be desirable for packaging certain articles. Alternatively, the article may be covered with grease or other liquid release.

Any plastic which forms a sufficiently rigid foam may be used. Polyurethane foam is economical and will usually be employed although other foams may be used. The shelf life of the package will be the life of the foam, and for polyurethane foam this may be indefinitely long.

The invention is further described in connection with the accompanying drawings, in which FIG. 1 illustrates various steps in the formation of a package;

FIG. 1A is a section which shows an article covered with film, supported in a mold, ready to be covered with foam;

FIG. 1B is a view of the next step in which liquid polyurethane is being introduced into the mold;

FIG. 1C is a view of the next step in which the mold is covered: the foam fills the mold;

FIG. 1D is the foam package removed from the mold;

FIGS. 2A (a section) and 2B (an elevation) are halves of the foam portion of the package, separated for unpacking, with a wheel still in the foam of FIG. 2A; and FIG. 3 is a top view of a cylindrical package.

The article 1, to be packaged, is advantageously first enclosed in film 2. This may be a bag of Mylar film which is sealed tight around the article. The covered article is supported on the piece of foam 4 in the mold 5. Any other type of support may be used.

One wall of the mold 6 is slidable along the base to form molds of different sizes. The shaft 7 is connected with means for positioning the wall to form a mold of desired size, and for opening the mold after the foam has set. Alternatively, the mouth of the mold may be somewhat larger than the inside base so that after the foam has set the package may be removed from the mold by merely inverting it. Polyurethane from storage 8 and foaming ingredient from storage 9 are fed into the mold (see FIG. 1B) to form the liquid layer 10 which quickly foams and fills the mold.

Alternatively, with the piece 4 of foam in place, and before or after starting to feed liquid into the mold, a bottom piece of film is placed on foam 4, the article 1 is placed on this and another piece of film is placed over the article, covering the sides. As the foam rises it raises the bottom piece of film up over the edges of the top piece, and the film completely encloses the article when the foaming is completed.

Alternatively, instead of enclosing in film which will be necessary for certain types of articles, other articles may be simply coated with grease or other release to facilitate eventual separation from the foam.

As the foaming is completed, the cover 12 is placed on the top of the mold, covering the foam 13. The piece 4 is incorporated as an integral part of the package.

Before introducing any foam into the mold, it may be desirable to cover the interior of the mold with a grease or other release. This may not be necessary, depending upon the compositions of the mold and the foam. The molds may be collapsible to facilitate storage when not in use. They may be of the wrap-around type.

The cover 12 is not essential. However, if a cover is used, a boss and congruent depression may be formed on the top and bottom of the mold, so that the packages may be stacked uniformly in storage or for transportation, without an upper package sliding off of a bottom package. Thus the circular boss 15 may be formed at the top and the depression 16 at the bottom of the package. If the packages are square, these may be square, or if it is desired to have one surface of the package always to the front of the stack, the boss and depression may be irregular so that the same surface is always to the front. Hand holes may be formed in the sides of the mold to facilitate lifting.

For heavy items, a round package, such as shown in FIG. 3 may be desirable, because it can be merely rolled to transport it from one place to another place on the same floor. The package may even be spherical.

The packages may be marked with paint and brush, using stencils if desired. The trademark (or name of the manufacturer, etc.) may be molded onto or into the package. This may be a solid boss or depression, or it may be a mere outline, etc. FIG. 6 illustrates such a trademark 20 on the end of a package. If embossed at one end of the package and depressed at the other end, they facilitate stacking the packages.

There are many known types of foaming agents which may be incorporated in the liquid plastic. They may "kick-off" in as little as 10 seconds to 30 seconds after mixing with the liquid. The foaming may be completed in 10 minutes, more or less. With polyurethane precursor (derived from either ester or polyether) it is only necessary to use water and a slight excess of the polyisocyanate required to react with the ester or polyether. The polyether-sorbitol polyurethane is often desirable because it produces a surface skin. With polyurethane or other plastics, methylene chloride or a Freon may be added to cause substantially instantaneous foaming. The amount of foaming agent added is controlled to make a heavier or lighter foam. A foam of intermediate weight will usually be preferred. It may be perfectly rigid, but for some packages a somewhat flexible foam is preferred. A heavy skin may be formed on the foam surface by treating the surface with solvent or heat, but usually this is not required.

There are several ways of opening such a package. One is to merely hack away at the foam until it is separated from the film or whatever separates the foam from the article. A better way is to provide a tear strip. This may be a wire—preferably a crimped wire—which is loosely wrapped around the article with the ends 25 exposed at the surface of the package. By tightening the wire while unwrapping it, and imparting a sawing motion to the wire, the foam is cut in two, as illustrated in FIGS. 2A and 2B which illustrate a wheel 18 packaged in foam 19. Alternatively, by anchoring one end of a wire to the article and exposing the other end at the surface of the foam, and then by pulling on the wire and swinging it first in one direction and then the other against the foam, the foam may be cut. If the foam is of the soluble type, the package may be made with a depression in the foam, which may later be filled with solvent to eat away sufficient foam to make it possible to easily separate the rest of it from the film that covers the article. By removing the foam in any manner, and then removing the film, the article is clean and ready for use. If the article is covered with grease, this may be easily removed.

I claim:

1. The method of forming a foam package which comprises supporting a piece of film on a support in a mold, placing the article to be packaged on the film above the support, covering the top and sides of the article with another piece of film, the pieces of film being large enough to overlap at the sides of the article, introducing into the mold (a) sufficient polyurethane precursor of the class consisting of polyesters and polyethers, (b) an excess of polyisocyanate, and (c) foaming agent in the proportions to produce a foam and allowing the mixture to foam and completely enclose the article, whereby the rising foaming mixture lifts the outer portion of the lower piece of film and closes it against the portions of the upper piece which are at the sides of the article and fills the mold to surround the article, and then removing the foam package from the mold.

* * * * *